Feb. 25, 1941.  F. B. HEWEL  2,233,131
FILTER
Filed April 20, 1937    2 Sheets-Sheet 1
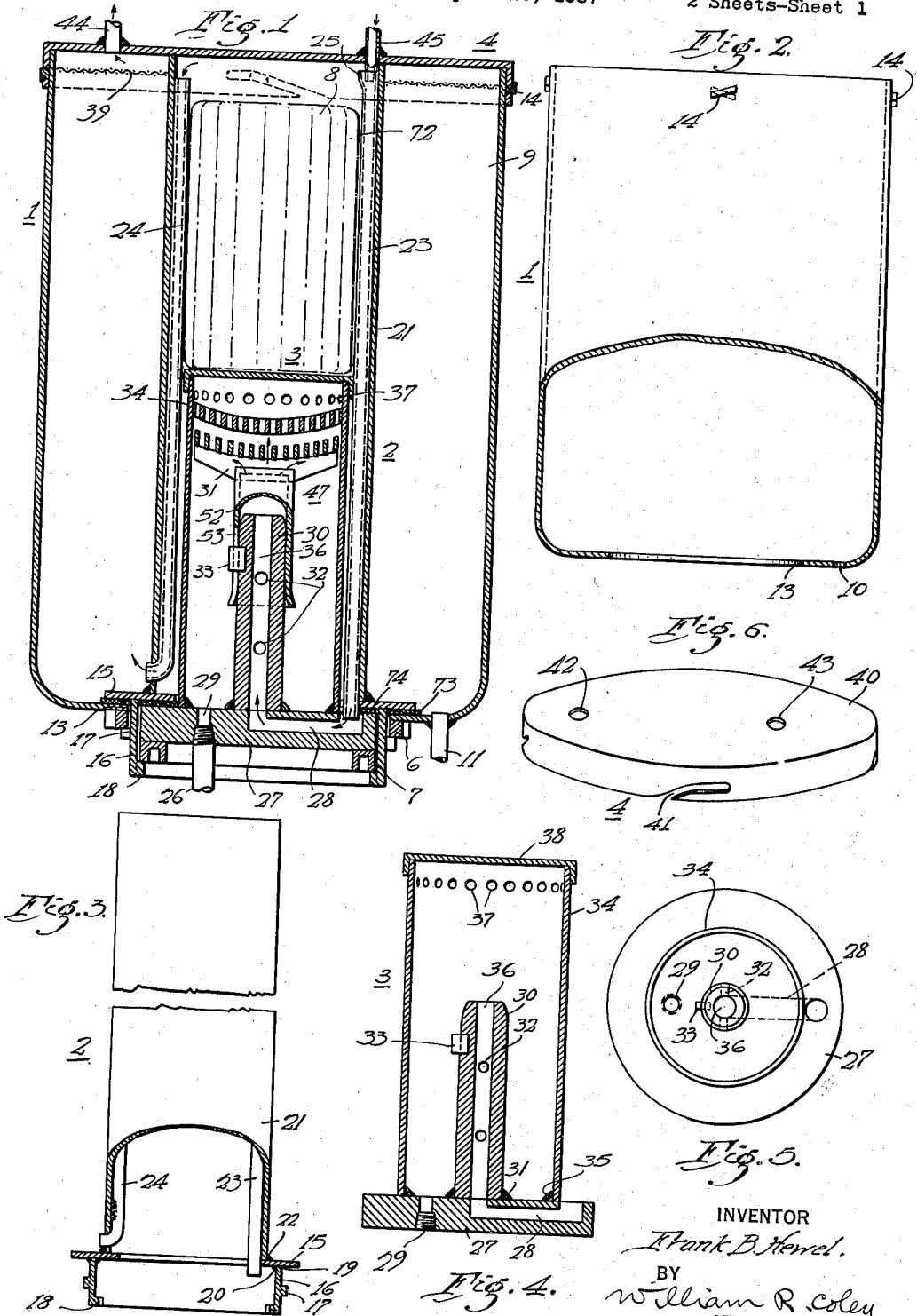
INVENTOR
Frank B. Hewel.
BY
William R. Coley
ATTORNEY

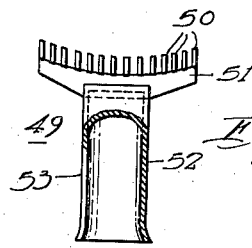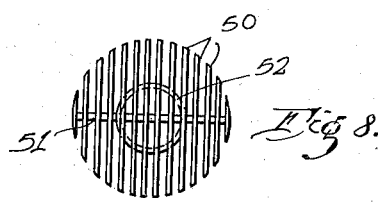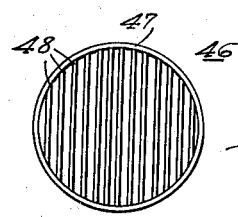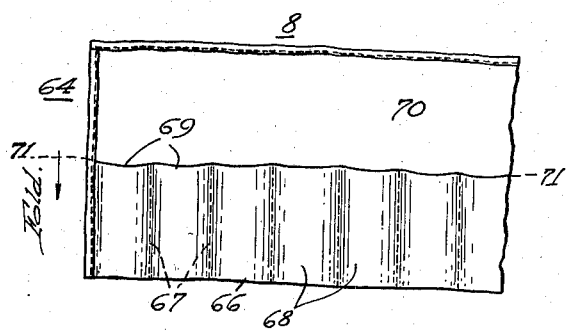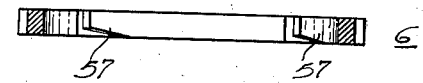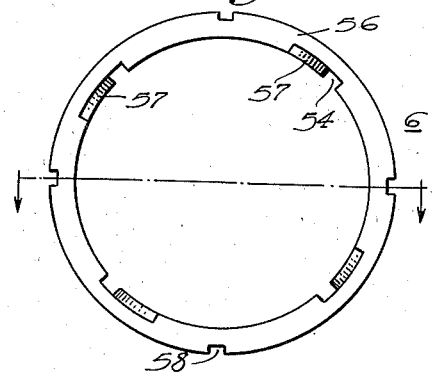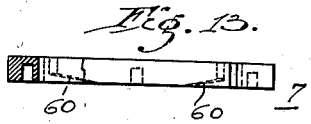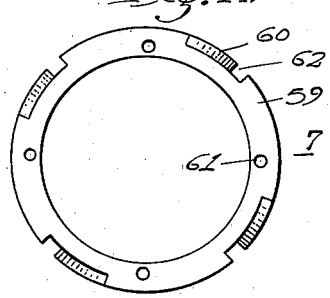

Patented Feb. 25, 1941

2,233,131

UNITED STATES PATENT OFFICE 2,233,131

FILTER

Frank B. Hewel, Pittsburgh, Pa.

Application April 20, 1937, Serial No. 137,927

8 Claims. (Cl. 210—167)

My invention relates to filtering devices for various fluids, such as gasoline and oil, and particularly to oil-filtering devices for trucks and automobiles.

One object of my invention is to provide a relatively simple, but effective, oil-filtering device for the purpose in question and one which may be readily and quickly assembled and disassembled.

Another object of my invention is to provide a filtering device of the metal-edge-filter type in which a stationary and a cooperating movable edge filter structure are provided, the relative movement thereof being effected while retaining a predetermined angular relation or alinement of the parts.

Another object of my invention is to provide a cooperating stationary and movable edge-filter device in which a telescopic relation of parts involving a movable member obtains, together with, preferably, a key and slot arrangement for retaining the desired alinement of parts during the relative movement of the filter members.

A further object of my invention is to provide an oil-filtering device including a container with an opening at one end, a composite hollow structure adapted to partially close the opening and a composite base structure disposed within the hollow structure to close the remainder of the opening, together with locking means interposed between the container and the hollow portion and between the base structure and the hollow structure.

Another object of my invention is to provide an edge-filter structure disposed within a hollow member, together with a container for filtering material resting on the filter structure and in part within the hollow member.

Another object of my invention is to provide a flexible container comprising one or more pockets for acid neutralizer material, together with a flap extending over the open end or ends of the pocket or pockets, the pocket or pockets and flap being rolled around an axis extending substantially parallel to the pocket or pockets.

Other objects of my invention will become evident from the following detailed description taken in conjunction with the accompanying drawings, wherein:

Figure 1 is a view in longitudinal section of an oil-filtering device constructed in accordance with my present invention; and Figs. 2 to 16, inclusive, are views, partially in elevation and partially in section, of various parts of the apparatus that is shown in Fig. 1.

Referring to the drawings, the structure there shown comprises an outer container 1, an inner container 2, a composite base and filter-holding structure 3, a closure or cap 4 for the two containers, a cooperating stationary and movable metal-edge filter structure 5 associated with the composite base structure 3, a plurality of locking means 6 and 7 for holding certain of the above-mentioned parts removably in place, a flexible container or bag 8 disposed within the inner container 2 for containing acid neutralizer material, and a roll 9 of cloth, preferably canton flannel, wound around inner container 2 and filling the annular space between containers 1 and 2.

The outer container 1, shown also in Fig. 2, may be substantially cylindrical in shape, having an open top and an opening 13 extending across the central portion of the bottom of the container, a plurality of inclined lugs 14 being provided near the top edge of the container for cooperating with the cap or cover member 4, as subsequently described. A small bottom opening 10 is also provided, for drainage purposes, as subsequently described, a pipe 11 being inserted therein.

The inner container 2, shown also in Fig. 3, comprises an annular plate 15 having a diameter larger than the opening 13 in the bottom of outer container 1, together with a hollow cylindrical portion 16 extending downwardly from the plate 15 and having a plurality of spaced lugs 17 on its outer wall and a plurality of spaced lugs 18 at the bottom of its inner wall. The cylindrical portion 16 may be secured to the plate 15 in any suitable manner as by welding fillets 19 and 20.

The upper portion of the inner container 2 comprises an elongated substantially cylindrical member 21 which is likewise rigidly secured to the plate portion 15 by means of a welding fillet 22. A plurality of pipes or conduits 23 and 24 are welded or otherwise suitably secured to substantially opposite portions of the internal wall of the cylindrical container 21, the pipe 23 terminating at the top in a bell mouth 25 and extending downwardly beyond the plate portion 15, while the pipe 24 has a right-angle bend at its lower end and terminates just above the plate portion 15. The purpose of these pipes or passages with respect to filtration of the oil will be subsequently set forth.

The composite base structure 3, also shown in Figs. 4 and 5, comprises a plate or base proper 27 having an internal U-shaped passage 28 therein of substantially shallow U-shape and also having a threaded opening 29 extending therethrough for receiving a drain pipe 26. A tubular member or sleeve 30 is secured as by welding fillet 31 to the central portion of the upper face of the plate 27, this tubular member being provided with a plurality of vertically spaced passages or openings 32 extending along diameters thereof through a central vertical opening or passage 36 which registers with one arm of the U-shaped opening or passage 28 in the base 27. In addition, a key or guide 33 is secured to one external wall of the tubular member 30 for a purpose to be set forth.

A substantially cylindrical member 34 is mounted on the upper face of the base 27, being secured thereto as by welding fillets 35. This member 34 substantially concentrically surrounds the central tubular member 30, and the outer arm of passage 28 in the base 27 is disposed just beyond the adjacent wall of the cylindrical member 34 for a purpose to be set forth. A cap 38 tightly fits over the top edge of cylinder 34.

A plurality of openings 37 are arranged in the cylinder 34, preferably in a substantially horizontal circle as clearly shown in Fig. 4, some distance below the top edge of the cylinder 34, for a purpose to be described.

An annular metal screen 39 is preferably disposed near the top of outer container 1.

The cap or cover member 4, also shown in Fig. 6, constitutes a shallow cylinder with a top face 40, a plurality of inclined slots 41 being cut in the cylindrical wall, while two openings 42 and 43 are provided in the top face for respectively receiving outlet pipe 44 and inlet pipe 45, as shown in Fig. 1.

The cooperating filter structure 5, shown also in Figs. 7 to 10, inclusive, comprises a stationary metal-edge filter structure 46 which is held by pins or by a force fit near the upper end of cylinder 34, which is mounted on base 27. The filter structure 46 comprises a peripheral ring 47 with which is preferably integrally secured a plurality of substantially parallel strips or bars 48 which extend edgewise in a substantially vertical direction.

The movable metal-edge filter structure 49, which cooperates with the stationary edge filter structure 46, comprises a plurality of strips or bars 50 which are staggered with respect to the strips 48 in order that they may interleave with the same, these strips 50 being welded or otherwise mounted on a transversely extending bar 51 which, in turn, is suitably secured to the upper edge of a small diameter cylinder or telescopic member 52 having a longitudinal slot 53 in one side thereof for cooperating with the key member 33 in tubular member 30, over which telescopic member 52 slides. The member 52 is closed at its upper end as shown in Fig. 1.

The locking means 6, illustrated also in Figs. 11 and 12, is shown as comprising a ring or annular member 56 having in its internal edge a plurality of spaced, inclined lugs or cams 57 adjacent to spaces or notches 54 and is also provided with notches 58 in its outer periphery. The purpose of the cam members 57 is to cooperate with lugs 17 on the outer wall of cylindrical portion 16 of inner container 2, while the purpose of the outer notches 58 is to provide a hold for a spanner wrench or the like.

The locking means 7, illustrated also in Figs. 13 and 14, is shown as comprising a ring or annular member 59, the outer edge of which is provided with a plurality of inclined lugs or cam members 60 adjacent to spaces or notches 62 for the purpose of suitably locking with internal lugs 18 in the cylindrical portion 16 of the inner container 2. The rings 59 are also provided with a plurality of spaced holes 61 for the purpose of being engaged by a spanner wrench or the like.

The flexible filtering material container 8, shown also in Figs. 15 and 16, comprises a layer of textile material 64, preferably canton flannel, which is folded along a line 66 and is provided with a plurality of substantially parallel seams 67, thereby providing a plurality of adjacent pockets 68 in which suitable acid-neutralizing filtering material, such as fuller's earth, may be disposed. The upper portion of the container shown in Fig. 15 thus comprises a single thickness flap 70 which may be folded over the pockets 68, when filled, along the line indicated by the reference character 71, corresponding to the top edge 69 of the pockets 68, and then the entire container or bag may be rolled into a spiral, along an axis extending substantially parallel to the pockets, as indicated in Fig. 16 by the reference character 72, this roll then being placed in the position shown in Fig. 1 resting on the stationary edge-filter structure 46.

The roll 9 of cloth, preferably canton flannel, is wound around inner container 2 and fills the annular space between containers 1 and 2, constituting a cloth edge filter for this space.

The assembly of the various parts shown in Figs. 2 to 16, inclusive, may be set forth as follows: The composite inner container 2 is inserted downwardly into the outer container 1, so that the lower cylindrical portion 16 extends through the opening 13 in the bottom of the outer container, while the outer part of the horizontal or plate portion 15 rests upon a suitable annular gasket 73 which is disposed outside the upper part of the cylindrical portion 16, the gasket thus being disposed to provide a fluid-tight junction between the outer container 1 and the plate portion 15.

The composite base structure 3 is then inserted upwardly through the bottom opening 13 in the outer container 1 and within the inner container 2, the angular location of the base structure being such that the internal passage 28 thereof registers with the lower end of pipe or passage 23 of the inner container 2, which pipe extends along the cylinder 34. To provide a fluid-tight junction between the plate portion 15 of inner container 2 and base structure 3, a second gasket 74 is disposed between these two parts, as shown in Fig. 1.

The outer container 1, inner container 2 and composite base structure 3 may then be rigidly assembled together by means of locking means or rings 6 and 7, the ring 6 being placed so that the internal notches 54 pass over the spaced lugs 17 of the lower cylindrical portion 16 of inner container 2 and the ring is then given a partial turn so that the cams or lugs 57 wedgingly engage the lugs 17 and thus lock the outer container 1 to the cylindrical portion 16.

Likewise, the inner locking ring 7 is placed so that its outer notches 62 pass over the spaced internal lugs 18 of cylindrical portion 16 and the ring is then given a partial turn so that the cams or inclined lugs 60 wedgingly engage the lugs 18, thus locking the base member 3 to the lower cylindrical portion 16.

It will be seen that the inner container 2, with its horizontal plate portion 15, thus covers a portion of the opening 13 in the bottom of outer container 1, while the base structure 3 covers the remainder of this opening, the parts being rigidly locked in position and being provided with suitable gaskets to provide fluid-tight joints.

The lower or removable edge-filter member 49 is then inserted downwardly within the inner container 2 to slip over the upwardly-projecting tubular member 30, care being taken to see that the slot 53 in the edge-filter structure registers with the guide or lug 33 in the tubular member.

The upper or stationary edge filter structure 46 is then placed in position, as shown in Fig. 1, being held by suitable pins or by a force fit, as previously mentioned. The cap 38 is then placed over the upper edge of cylinder 34.

The flexible bag or container 8, after the pockets 68 thereof have been filled with suitable acid-neutralizing material and after it has been wrapped into a roll or spiral, as shown in Fig. 16, is then inserted within the inner container 2 until the lower edge thereof rests upon the cap 38 of cylinder 34, as indicated by the dotted lines in Fig. 1.

The cloth edge filter 9 or roll of canton flannel is then forced into the annular space between inner container 2 and outer container 1.

The cap or cover 4 may then be placed in position, care being taken to aline the stub end of inlet pipe 45 with the bell mouth 25 of pipe 23, while at the same time placing the slots 41 in alinement with the lugs 14 on the container, after which a slight turn will lock the cover in place.

It will be appreciated that the reverse procedure may be followed for disassembly purposes, so that a quick and easy assembly and disassembly is provided. It is thus a simple matter to clean the filter metal parts and replace the cloth parts 8 and 9.

Assuming that the oil-filtering structure shown in Fig. 1, after being assembled as noted above, is connected to the oil-circulating system of an internal combustion engine or the like, the pipe 45 being connected to be the inlet for the oil to be filtered and the pipe 44 being connected to be the outlet therefor, the path of the oil, which is indicated by arrows, is as follows: From the inlet pipe 45 through pipe or passage 23 of the inner container 2, to passage 28 of the base structure 27, to vertical passage 36 within the tubular member 30 and thence outwardly through openings 32 which are uncovered by upward movement of the member 52 and then upwardly through the movable filter structure 47 and stationary filter structure 46 and holes 37 to the acid-neutralizing-material-containing bag 8. After passing through this bag or container 8, the oil flows into the top of pipe or passage 24 of the inner container 2 and thence downwardly through the pipe, being discharged at the lower end thereof near the bottom of outer container 1, whence the oil travels upwardly through the roll 9 of canton flannel and, after passing through screen 39 near the top of the container, flows outwardly through outlet pipe 44 to the engine.

The increase and decrease of the oil level in the inner container 2 during the operation of the internal combustion engine causes the movable edge filter 47 to telescopically slide up and down on the tubular member 30 due to oil pressure acting on the upper closed end of the member 52, thereby providing the well-known metal-edge-filtering action whenever the strips 59 of the movable filter structure 49 interleave with the stationary strips 48 of the stationary filter structure 46. In order to provide any necessary bypass or outlets, the holes 32 in the tubular member 30 are provided. When the oil pressure decreases, the member 52 drops to thereby again close the openings 32.

The illustrated structure embodies a double sump to catch water, sludge, etc. One sump is the bottom of the annular space between tubular member 30 and cylinder 34, whereby sludge or water may settle before the oil reaches the metal-edge-filter structure 5 and be drained off when desired through pipe 26. The other sump is the bottom of the annular space between inner container 2 and the walls of outer container 1, whereby sludge or water still carried by the oil may settle before the oil travels upwardly through cloth edge filter 9 and be drained when desired through pipe 11. The elimination of some dirt and sludge by the settling process in these sumps serves to prolong the life of the cloth container 8 and cloth roll 9.

It will be seen that I have thus provided a complete oil-filtering structure which will remove sludge and other mechanical impurities by reason of the cooperating stationary and movable edge-filter structures I have provided, while acid in the oil is removed by reason of its passage through the container 8 for acid-neutralizing material. The sludge which drops to the bottom of the inner cylinder 34 and outer container 1 and is not removed through drain pipes 26 and 11 may be removed by unlocking the rings 6 and 7 and removing the base structure 27 and inner container 2 after the oil in the apparatus has been drained out by means of the drain pipes. For drainage purposes, it will be understood that normally closed valves or pet-cocks (not shown) are provided in pipes 26 and 11.

On the other hand, when it is desired to renew the acid-neutralizing material, it is merely necessary to remove the cover 4, pull out the container 8, remove the used material from the pockets 68 thereof and refill them with new acid-neutralizing material.

By reason of the provision of the composite structures 2 and 3, a minimum number of readily assembled parts is provided which minimizes the necessary labor and possible loss of parts in connection with the disassembly and reassembly of the apparatus.

I do not wish to be restricted to the specific structural details or arrangement of parts herein set forth, as various modifications thereof may be effected without departing from the spirit and scope of my invention. I desire, therefore, that only such limitations shall be imposed thereon as are indicated in the appended claims.

I claim as my invention:

1. A device comprising a container having an opening at one end, a structure having a plate portion adapted to partially close said opening and having a hollow substantially cylindrical portion extending therethrough, a base structure disposed within said hollow portion to close the remainder of said opening, a substantially cylindrical member extending from said plate portion into said container, an inlet pipe secured to one wall of said cylindrical member, outlets between said cylindrical member and said container and leading from the container; a tubular member secured to said base structure and extending within said substantially cylindrical member, and a filter structure mounted on said tubular member within said cylindrical member, said base structure having an internal passage extending between one end of said inlet pipe and the passage through said tubular member thereby to pass fluid through said filter structure and said outlets.

2. A device comprising a container having an opening at one end, a structure having a plate portion adapted to partially close said opening and having a hollow substantially cylindrical portion extending therethrough, a base structure disposed within said hollow portion to close the remainder of said opening, a substantially cylindrical member extending from said plate portion into said container, an inlet pipe secured to one wall of said cylindrical member, outlets between said cylindrical member and said container and leading from the container, a tubular member secured to said base structure and extending within said substantially cylindrical member, a filter structure mounted on said tubular member within said cylindrical member, said base structure having an internal passage extending between one end of said inlet pipe and the passage through said tubular member thereby to pass fluid through said filter structure and said outlets, a locking ring interposed between said container and the outer side of said cylindrical portion, and a second locking ring interposed between said base structure and the inner side of said cylindrical portion.

3. In a filtering device, a hollow member, a stationary edge-filter structure disposed therewithin at a distance from one end thereof, a container for acid neutralizer material resting on said filter structure between it and said end, an inlet leading into said hollow member at the end opposite said container, and an outlet from said hollow member leading from said one end.

4. In a filtering device, a substantially cylindrical hollow member, a stationary edge-filter structure disposed therewithin at a distance from one end thereof, a rolled textile material container for acid neutralizer material resting on said filter structure between it and said end, an inlet leading into said hollow member below said filter structure, and an outlet from said hollow member leading from above said container.

5. In a fluid-filtering device, a filter chamber, a stationary edge filter and a movable edge filter vertically disposed in said filter chamber, said movable edge filter being mechanically positioned to interleave with said stationary edge filter, a first guiding member having a passage and fluid-passing openings therein communicating with said passage and with said chamber and being fixedly secured within said chamber, a second guiding member having a telescopic engagement with said first guiding member and being slidable therealong to uncover said openings and having a closed upper portion, said movable edge filter being mounted on said second guiding member, a fluid inlet for supplying fluid to be filtered to said passage to flow through said openings to the chamber below said movable edge filter, a fluid outlet from the chamber above the stationary edge filter, said movable edge filter being movable up and down by increase and decrease of pressure of fluid supplied through said fluid inlet to act on said closed upper portion of said second guiding member.

6. In a fluid-filtering device, a filter chamber, a stationary edge filter and a movable edge filter vertically disposed in said filter chamber, said movable edge filter being mechanically positioned to interleave with said stationary edge filter, a first guiding member fixedly secured within said chamber and having a passage therein and openings communicating with said passage and with said chamber, a second guiding member having a telescopic engagement with said first guiding member and being slidable therealong and having a closed end, said movable edge filter being mounted on said second guiding member, a fluid inlet for supplying fluid to be filtered to said passage within said first guiding member, said openings passing fluid from said passage into the passage to flow through said openings to the chamber and below said movable edge filter, and a fluid outlet from the chamber above the stationary edge filter, said movable edge filter being movable up and down by increase and decrease of pressure of fluid supplied through said fluid inlet to act on said closed end of said second guiding member.

7. In a fluid-filtering device, a filter chamber, a stationary edge filter and a movable edge filter vertically disposed in said filter chamber, said movable edge filter being mechanically positioned to interleave with said stationary edge filter, a first guiding member having a passage and fluid passing openings therein communicating with said passage and with said chamber and being fixedly secured within said chamber, a second guiding member having a telescopic engagement with said first guiding member and being slidable therealong to uncover said openings and having a closed upper portion, said movable edge filter being mounted on said second guiding member, cooperating means on the respective guiding members for maintaining the desired interleaving alinement of said edge filters during such slidable movement, a fluid inlet for supplying fluid to be filtered to said passage to flow through said openings to the chamber below said movable edge filter, and a fluid outlet from the chamber above the stationary edge filter, said movable edge filter being movable up and down by increase and decrease of pressure of fluid supplied through said fluid inlet to act on said closed upper portion of said second guiding member.

8. In a fluid-filtering device, a filter chamber, a stationary edge filter and a movable edge filter vertically disposed in said filter chamber, said movable edge filter being mechanically positioned to interleave with said stationary edge filter, a first guiding member fixedly secured within said chamber and having a passage and fluid-passing openings therein communicating with said passage and with said chamber, a second guiding member having a telescopic engagement with said first guiding member and being slidable therealong to uncover said openings and having a closed end, said movable edge filter being mounted on said second guiding member, said second guiding member having a slot extending in the direction of such slidable movement and said first guiding member having a key operable in said slot during such slidable movement for maintaining the desired interleaving alinement of said edge filters, a fluid inlet for supplying fluid to be filtered to said passage to flow through said openings to the chamber below said movable edge filter, and a fluid outlet from the chamber above the stationary edge filter, said movable edge filter being movable up and down by increase and decrease of pressure of fluid supplied through said fluid inlet to act on said closed end of said second guiding member.

FRANK B. HEWEL.